Nov. 29, 1960 G. W. WACKER 2,961,705
METHOD AND APPARATUS FOR PACKAGING FLUID MOLDING MATERIAL
Original Filed Jan. 17, 1955 5 Sheets-Sheet 1
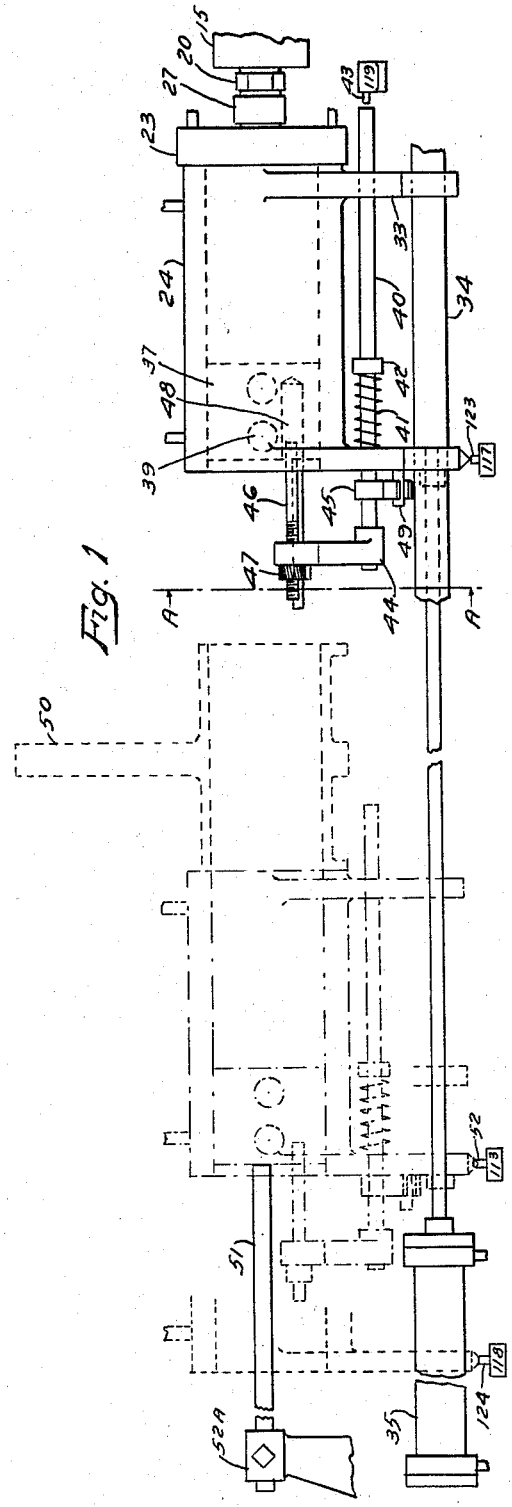
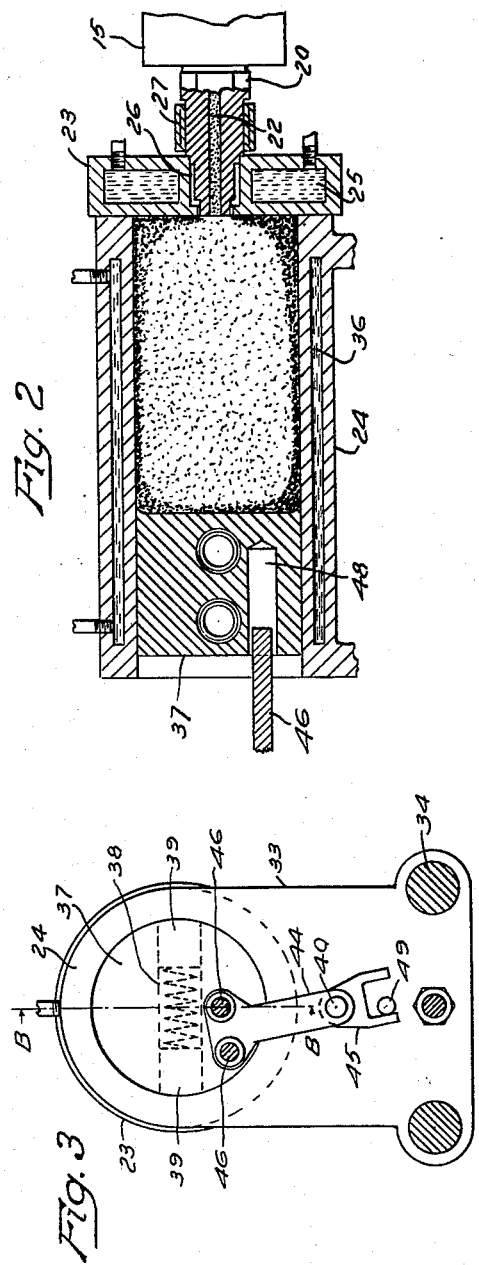
INVENTOR.
George W. Wacker

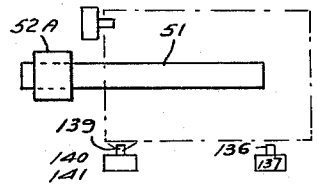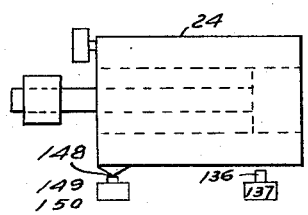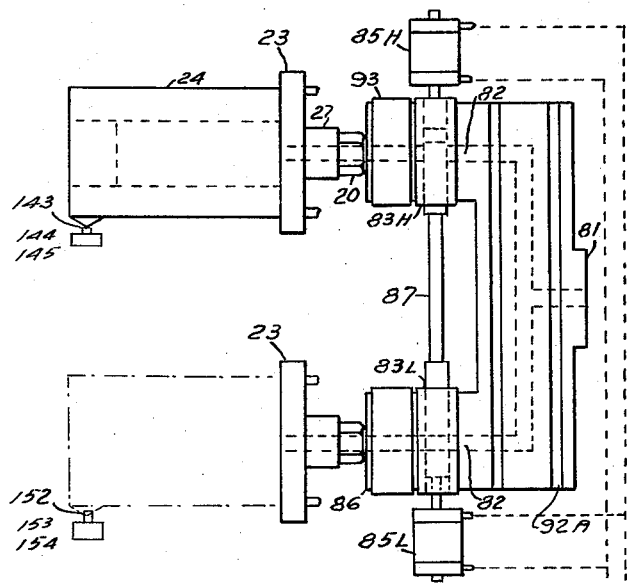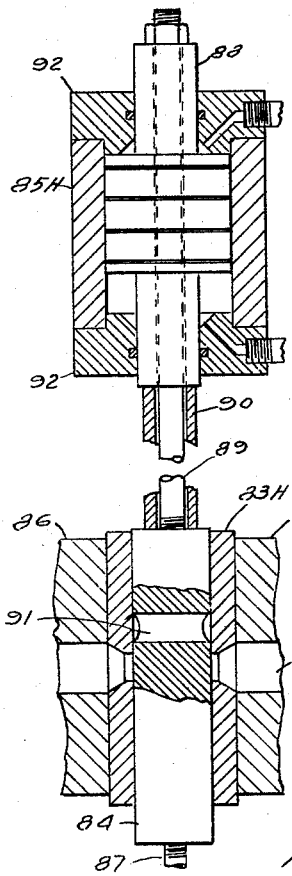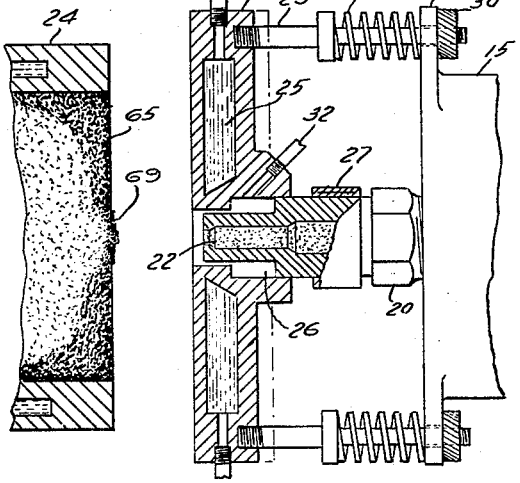
Fig. 4
Fig. 5
Fig. 6
INVENTOR.
George W. Wacker

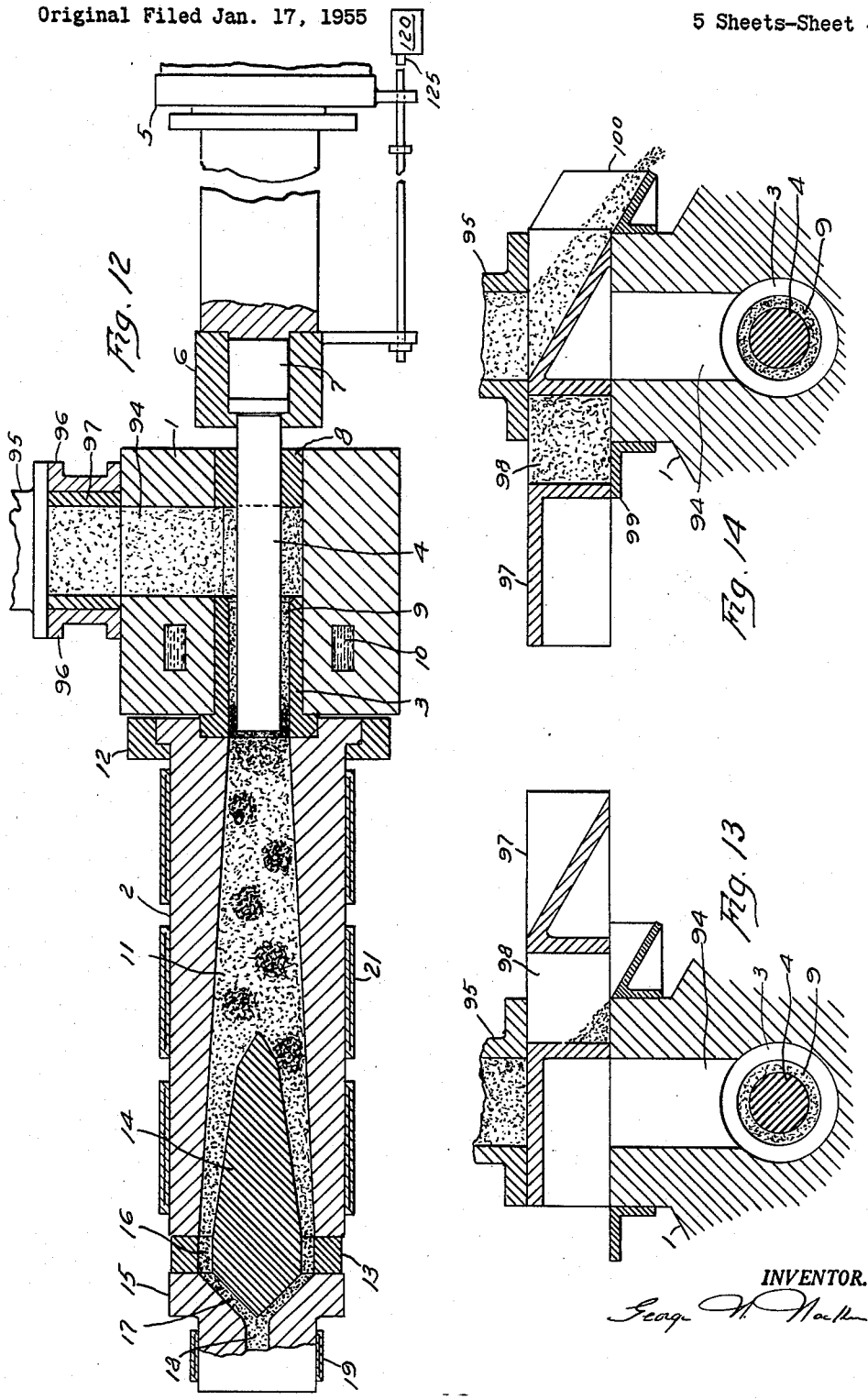

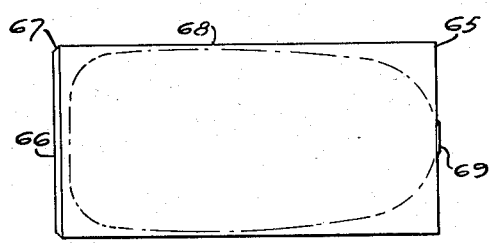
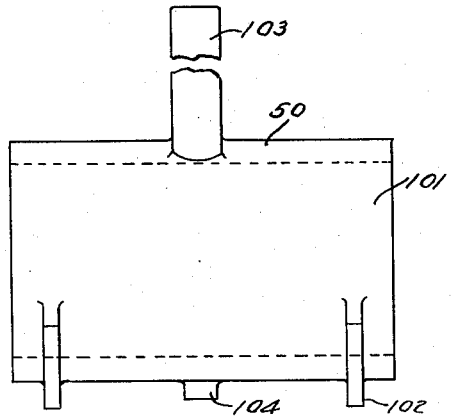
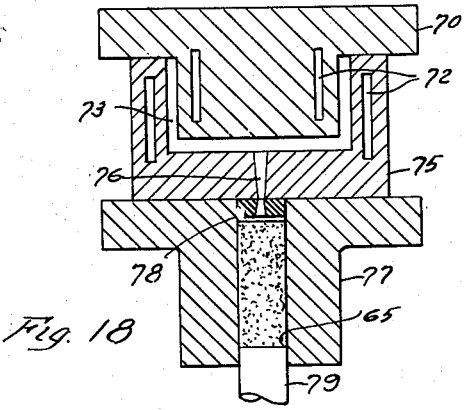
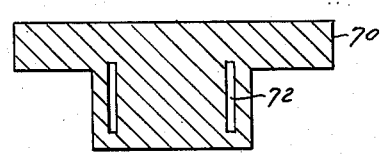
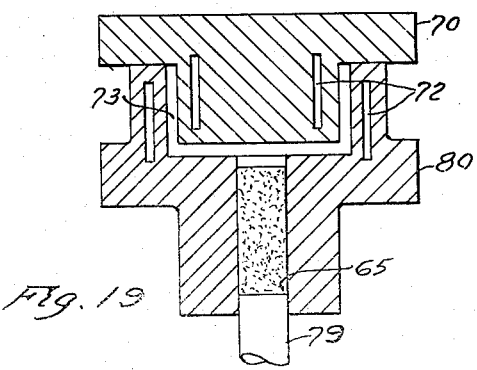
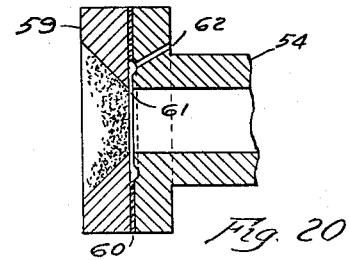

United States Patent Office 2,961,705
Patented Nov. 29, 1960

2,961,705

METHOD AND APPARATUS FOR PACKAGING FLUID MOLDING MATERIAL

George W. Wacker, 4762 Reading Road, Cincinnati 37, Ohio

Original application Jan. 17, 1955, Ser. No. 482,321. Divided and this application May 12, 1958, Ser. No. 736,436

1 Claim. (Cl. 18—30)

This application is a division of application 482,321 filed January 17, 1955, now abandoned, and the invention relates to the molding of plastic materials. More specifically, this invention concerns a method and apparatus for packaging heated, fluid thermoplastic molding materials.

The object of this invention is to provide a machine to convert hard, granular molding material to a heated, fluid condition, and to then mold the fluid material into form retaining cylindrical packages consisting of flowable material enclosed in a integrally formed container.

These packages, called "premoldings" in the parent application, are the basis for an improved way to mold articles from the thermoplastic materials using the injection, transfer, plunger and compression methods. When used in an injection machine, for molding both small and large objects, the packages bring about substantial advantages and savings. For example, they reduce injection pressures by as much as fifty percent. They permit a proportional reduction in mold clamping tonnage. They prevent excessive mold packing and over weight moldings. They permit a higher rate of injection. They provide a more uniformly plasticated charge of material resulting in an improved product. They make possible faster operating cycles to increase machine output. They prevent the sticking and gauling of large diameter injection plungers. They prevent the heat degrading of material in the event of a prolonged cycle delay.

Generally speaking, the package is a measured charge of molding material which has been heated to fluidity but short of injection temperature in means separate from the injection assembly of the molding machine. The charge is packed in a integrally formed cylindrical container, which is another way of saying that a fluid mass is treated in a manner to congeal the outer surface to a degree of hardness sufficient to retain cylindrical dimensional stability when removed from the packaging machine. The package may be held in the gloved hand, and is soft enough to be squeezed out of shape by hand. It can be stored for periods up to an hour before being used in the press. The inside of the package is of honey-like consistency and is absolutely free of trapped air which could cause defective work. The volume of the package is predetermined to suit the work, thereby permitting the use of a "bottoming" injection plunger. The machine is adapted to make packages of differing volume successively by the use of a selective volume control. The package has end walls which are substantially thicker than the side wall. The end wall which will abut the injection plunger is made thicker than the opposite side wall, and by being made of congealed material will prevent the leakage of material past the plunger, regardless of pressure. The opposite end wall is provided with a chamfer at its periphery to assist the operation of an air vent in the pressure cylinder of the injection assembly of the press. Both end walls are formed in a manner to keep them flat and free from any projecting material. A mechanism is provided to deliver the packages into a holder or sleeve adapted to transfer the package to, and co-operate with, the injection assembly of the press.

Attention is directed to U.S. Patent 2,689,376 issued to this applicant for apparatus and method to make packages of fluid thermoplastic molding material, and limited to use in plunger, transfer and compression molding machines. In attempting to adapt the method of said patent to the "continuous" injection molding machine, it became evident that important modifications were necessary.

For example, the sprue formed by the tapering inwardly projecting and cooled orifice disclosed in the patent must be eliminated because it tended to prevent positive separation of the package and the chill plate, with the result that the package sometimes remained securely attached to the chill plate when the pot was withdrawn. The sprue was objectionable because it increased the overall length of the package. No provision is disclosed to measure accurately the volume of material comprising the package. No provision is disclosed to selectively and successively change the volume of material comprising the package. No provision is made for transferring the package to a portable sleeve or holder adapted for use in an injection assembly for an injection molding machine. These shortcomings are all taken care of in the method and apparatus of this invention.

Attention is directed to the divisional application No. 734,240, filed May 9, 1958, by this applicant entitled, "Method and Apparatus for Injection Molding." This other and co-pending application relates to the use of the heated, cylindrical package of molding material of this present invention, in an injection assembly for an injection molding machine specially adapted for such use.

In the drawings:

Figure 1 is a schematic side elevation of the reciprocable pot assembly shown in operative association with the fixed type chill plate. The assembly is shown partly retracted by dot and dash lines, and fully retracted by dotted lines. The transfer sleeve is shown in receiving position by dotted lines.

Figure 2 is a schematic sectional view through the cylindrical bore of the pot assembly, line b—b, Figure 3. The chill plate and nozzle are also shown in section. The parts are positioned to show a completed package, with the congealed portion of the integral container stippled in heavier than the fluid interior.

Figure 3 is a schematic sectional end view on line a—a, Figure 1. It shows in more detail the selective volume control means.

Figure 4 is a schematic top view of an apparatus using two pot assemblies as required when a constant flow of heated material must be packaged.

Figure 5 is a schematic sectional view through an axially movable chill plate adapted to support the end wall of the package until the material is severed to avoid distortion of the wall by the drag of the material.

Figure 6 is a schematic sectional view of the valve actuating mechanism used for the pot arrangement shown in Figure 4.

Figure 12 is a schematic sectional view through the heating and pressurizing apparatus using a displacement type of plunger adapted to prevent metal to metal contact between the plunger and its co-operating bore, and fitted with a material flow control valve.

Figure 13 is a schematic section through a material flow control valve positioned to block the flow of material from the hopper to the heating apparatus preparatory to shutting down the machine.

Figure 14 is a schematic section through the material flow control valve positioned to direct the flow of material from the hopper to collecting means separate from the machine, to empty the hopper.

Figure 15 is an outline drawing of a cylindrical package consisting of heated, fluid thermoplastic molding material enclosed in an integral container, to show the functional features of the package.

Figure 16 is an outline drawing showing the functional features of a portable transfer sleeve adapted to use with this packaging machine.

Figure 17 is a schematic section through a compression type mold adapted to be heated and cooled, with a package of thermoplastic material inserted in the cavity.

Figure 18 is a schematic section through a transfer type mold adapted to be heated and cooled, showing a package of thermoplastic material in the pressure cylinder, and featuring the sprue plate which separates the package from the mold.

Figure 19 is a schematic section through a plunger type of mold adapted to be heated and cooled, showing a package of thermoplastic molding material in the pressure cylinder which opens directly into the mold cavity.

Figure 20 is a schematic section through an adjustable air vent as required in the pressure cylinder of an injection assembly adapted to use packages of molding material.

Description

Figure 7:
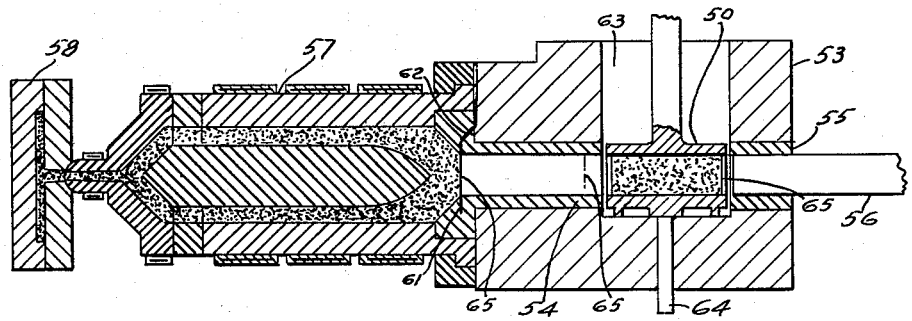
Figure 7 is a schematic sectional view through the injection assembly of an injection molding machine adapted to use cylindrical packages of molding material. This figure is provided to clarify the operation of functional features of the package as described in this specification.

This apparatus is essentially a plunger type extruder fitted with a molding attachment. When working certain materials likely to be degraded by local heating beyond a critical temperature, a screw type extruder may be required.

The extruder

Referring to Figure 12, the extruder section comprises a main housing 1 to which is attached a heating chamber barrel 2. A flanged pressure cylinder 3 is pressed into housing 1. Operating in the pressure cylinder is a plunger 4 driven by a piston and cylinder mechanism 5. The plunger is attached to the piston of the mechanism by a retainer 6 enclosing a spacer 7. A guide bushing 8 centers and supports the plunger.

A displacement type plunger is shown which has an annular clearance space 9 between it and the bore of the pressure cylinder. This clearance is sufficient to permit a limited reverse flow of material which is not "leakage" in the usual sense, but of such width as to assure uniformity of side thrust of material on the plunger to prevent metal to metal contact between the plunger and bore.

The reverse flow of material is opposed by frictional contact of the material with the bore of the pressure cylinder and the surface of the plunger. The flow occurs under high pressure and converts energy into heat resulting in a plasticating effect which augments the heating effect of the heating chamber. To keep this heating effect within bounds, provision is made to circulate a coolant through the passage 10 in the housing 1. Under certain conditions where positive displacement of the plunger is required, a conventional close fitting plunger must be used.

It should be understood that the operation of this apparatus is such as to plasticate the material only to its flow point and to then force the hot, viscous material through the nozzle 20, Figure 2. If the material was heated to a free flowing condition suitable for injection into a mold, undesirable gassing and expansion would result to defeat the purpose of this apparatus, as will be explained later.

The piston and cylinder mechanism is conventional, and may comprise standard Vickers components.

Fixed type chill plate

Figure 2 shows a fixed type chill plate and nozzle assembly in operative association with a reciprocable pot assembly. These are parts of the mold structure and comprise a nozzle 20 having an orifice 22 and adapted for attachment to the chamber cap 15 of the extruder mechanism. Mounted in a manner to surround the nozzle is a chill plate 23 shown serving as a closure for one end of the pot 24. The chill plate is provided with an annular coolant passage 25, and is separated from the nozzle by an annular air space 26 adjacent its flat working surface. This air space permits the nozzle to be maintained at approximately 325 degrees F. by the electric heater 27 while the working surface of the chill plate may be held around 150 degrees F.

In addition to serving as a closure for one end of the pot, the chill plate functions to congeal the surface of the molding material as it is forced to flow radially across its cool working surface thereby forming a flat end wall for the package which will not adhere to the chill plate. In contrast, the hot nozzle functions to keep the material in the nozzle tip, including a limited area of the wall at the nozzle tip, in a soft, easily severed condition so that negligible resistance to the separation of the pot, including the package, and the chill plate will be offered by the material at the nozzle tip. Instead, the connection is easily severed without any undesirable drag on the relatively weak flat end of the package in the pot, and also without the formation of an undesirable extension, or sprue, from the end wall of the package.

Stripper type chill plate

Figure 5 shows a chill plate assembly adapted for use with relatively tough material, comprising a chill plate 23 adapted for axial movement relative to the nozzle 29. The nozzle is attached to a chamber cap 15 provided with ears 28 adapted to support spring loaded studs 29 that are attached to the chill plate. Nuts 30 are provided to adjust the travel of the chill plate with respect to the nozzle under the urging of the springs 31.

In operation, the pot 24 is brought into operative association with the chill plate during which the working surface of the plate is pushed back to line with the end of the nozzle against the resistance of the springs 31.

Upon the separation of the pot and chill plate, the plate will follow the mold for a distance determined by the nut 30. This distance is sufficient to break, or sever, the material connection between the package end wall and the material in the nozzle orifice 22, but in this construction the weak end wall of the package is supported by the chill plate until after the material is severed. In this way a tough material cannot distort the flat end wall of the package, nor can it pull the package out of the mold.

Negative atmosphere

Under certain conditions, vapors emanating from the orifice 22 will discolor clear molding materials at the start of making a package. To avoid this, an outlet 32 is provided communicating with the annular space 26. The outlet is connected with a jet device or with a vacuum pump to maintain a negative atmospheric pressure in the annular space to cause a current of air to flow into the space from the working surface of the chill plate to prevent the presence of vapor adjacent the working surface at the start of making a package.

Pot assembly

Figure 1 illustrates a form of molding attachment using a single mold and comprises a pot assembly 24 having a water cooled cylindrical bore 36 provided with downwardly disposed extensions provided with guide holes adapted to fit a pair of guide rods 34. A piston and cylinder mechanism 35 is provided to slide the pot assembly in to and out of operational engagement with the chill plate 23.

A close fitting piston 37 operates in the bore, and is fitted with frictional braking means comprising a compression spring 38 and a pair of friction plungers 39 operating in a hole bored in the piston. The piston is kept at pot temperature by contact with the wall of the bore.

The near end of the piston is recessed in a manner to provide a chamfer on the end wall of the package 67, Figure 15. This chamfer serves as a temporary air space to cooperate with an air vent during a subsequent operation.

Measuring device

To measure the volume of material forced into the cylindrical pot, a metering rod 40 is slidably mounted in holes drilled in extensions 33. A compression spring and collar 41—42 urge the rod to the right to operate a limit switch 43 while the pot assembly is in operative association with the chill plate. A selector arm 44 and stop lever 45 which co-operates with stop pin 49 are mounted on the left end of the metering rod.

Arm 44 is provided with two threaded holes to receive metering screws 46 and lock nuts 47. A single hole 48 is drilled in the far end of piston 37 of a size and depth to receive one or the other of the metering screws 46, depending upon the position of the selector arm 44. The metering screw which enters the hole 48 is ineffective, and its mate, which will contact the end surface of the piston, will determine the time of operation of the limit switch 43.

Operation of molding attachment

The piston and cylinder mechanism 35 is activated to advance the pot assembly into contact with the chill plate. At this time the piston 37 resides at the near end of the cylindrical bore. When the pot contacts the chill plate, a limit switch 123 operates to start the extruding mechanism, forcing fluid molding material through the nozzle orifice 22.

The entrance of material is blocked by the piston except for the recess formed in the end of the piston, and the material is free to flow into this recess, to flow radially across the end of the piston and the cool working surface of the chill plate, until it encounters the cool bore.

Up to this time, two congealed discs or end walls will have been formed with hot, fluid material between them. From this point, the material entering the bore under pressure progressively forces the piston to the left, with the piston offering yielding resistance sufficient to assure the formation of a dense cylindrical mass entirely free from trapped air.

As the piston is pushed to the left the congealed end walls are displaced relative to one another. Being in continuous contact with cool surfaces, the end walls continue to congeal to an ever increasing depth, with the wall in contact with the chill plate becoming the thicker of the two. The integrally formed cylindrical side wall of congealed material is relatively thin, and being formed progressively, will be somewhat thicker toward the chill plate end.

As the piston is forced to the left, it finally assumes a position as shown in Figure 2. At this point the ineffective metering screw has entered the hole 48, while its mate has contacted the end surface of the piston and operates to slide the metering rod 40 against the pressure of spring 41 to operate the limit switch 43 and stop the operation of the extruding mechanism.

To remove the cylindrical mass of material now constituting a "package" and consisting of an interior of hot, fluid material enclosed in an integrally formed container of congealed material, the mechanism 35 is operated to retract the pot assembly out of operative association with the chill plate.

The retraction of the pot assembly is automatically interrupted by a limit switch 52, Figure 1, at a dwell position, shown in dot and dash lines. At this point a portable transfer sleeve 50, Figures 1 and 16, is placed in position adjacent the open end of the partly retracted pot to receive the package.

The retraction of the pot assembly is resumed. The piston now strikes the end of the ejector rod 51, which prevents further retraction of the piston and holds it stationary while the pot continues to retract. As a result, the piston is moved back to its starting position with respect to the bore, and the piston automatically pushes the package out of the bore and into the waiting transfer sleeve.

Under certain conditions, a single packaging machine can supply two or more injection molding machines making unlike moldings. By shifting the volume selector arm to one position or another, the volume of material in the packages can be made to vary. The volume selector is essential for maintaining the proper volume of material in each package when supplying an injection molding machine using a "bottoming" type injection plunger.

It should be noted that the method of filling the pot to make the package requires a number of strokes of the plunger of the extruding apparatus, each stroke delivering a small quantity of material, as distinguished by the usual method of filling a mold cavity by a single stroke of the plunger.

The package

Figure 15 is an outline drawing of a cylindrical package consisting of a measured volume of heated, fluid thermoplastic molding material enclosed in a integrally formed container. The package has an outside diameter permitting easy insertion into the pressure cylinder of an injection assembly, but it is not so small as to accumulate an unnecessary amount of trapped air during a subsequent molding operation.

The congealed end wall 65 formed by the chill plate 23, Figure 2, is relatively thick at the outside diameter. This is the wall which is positioned against the plunger of the injection assembly where it functions as a seal to prevent the leakage of fluid molding material into the plunger clearance space. This is because the congealed material comprising the wall expands against the bore of the pressure cylinder in a manner to prevent the fluid contents of the package from reaching the plunger clearance space. The congealed material will not pass into the clearance space under the available injection pressure.

The end wall 66 formed by the cool piston 37, Figure 2, includes the congealed chamfered corner 67 which will retain its form for time enough to permit air trapped in the corner space to escape through the vent 61, Figure 20, during the subsequent injection operation.

The congealed cylindrical section 68, Figure 15, is relatively thin, and it will permit collapse of the package if stood on end unsupported because of absorbtion of heat from the hot interior. The dot and dash line represents roughly a diffused zone separating the relatively hard, congealed skin from the hot, fluid material comprising the interior of the package.

A relatively small area of soft material 69 in the end wall 65 is due to its being in contact with the hot flat tip of the nozzle 20, Figure 2. It has served its purpose by permitting the stream of material to sever easily during the separation of the pot assembly 24 and the chill plate 23 so that a substantially flat end wall without an undesirable sprue was formed.

Packages are left in the transfer sleeves or other holders during their stay in a storage, or inspection station while waiting their turn to be used in an injection, transfer, plunger or compression molding press. In this way distortion due to a restoration of plasticity to their thin cylindrical section can be controlled.

It is to be understood that the package is made from thermoplastic molding material heated only to its approximate flow temperature, and not to its injection temperature. This is to avoid undesirable gassing and expansion when the package is ejected from the cylindrical pot assembly. This is accomplished by working the material at the lowest temperature at which it may be forced through the nozzle orifice under high pressure, with substantially all the pressure being used in getting the material through the heating apparatus and the nozzle. This method differs from conventional injection molding wherein only a portion of the injection pressure is expended in the heating apparatus.

Hopper slide valve

Figures 13 and 14 illustrate diagrammatically a form of slide valve adapted to selectively direct the flow of granular molding material from a hopper 95 to the throat chamber 94 of an extruder, or to collecting means exterior of the extruder, or to block the flow of material from the hopper, comprising a pair of spacer elements 96 adapted to form a track between housing 1 and the hopper 95. A slide valve 97 is adapted to operate in the track and is normally positioned to allow the passage of material from the hopper through port 98 in the slide, to the throat chamber as shown in Figure 12.

To temporarily stop the operation of the extruder the slide 97 is moved to the right as shown in Figure 13, blocking the flow of material from the hopper to the extruder. To empty the hopper, the slide is moved to the left as shown in Figure 14, so that the contents of the hopper may be diverted to suitable collecting means exterior of the exterior of the extruder. After the hopper is emptied, the slide may be withdrawn to permit an air hose to be inserted into the throat chamber for cleaning purposes. An extension 99 is provided to prevent spillage of material trapped in port 98. Chute 100 is provided to direct the flow of material to a suitable receptacle.

Transfer sleeve

Figure 16 illustrates a portable transfer sleeve suitable for receiving, transferring and temporarily storing a package of heated thermoplastic molding material. It is also adapted to position the package in the throat of an injection assembly of an injection molding machine, and to operate a safety interlock.

The sleeve is essentially a thin cylindrical holder open at the ends, with a bore 101 sized to receive the package and to permit the through passage of the plunger of the injection assembly.

Ears 102 comprising segments of a circle concentric with the bore 101 and sized to fit the bore of the throat 63 of the press, Figure 7, are provided to properly locate the sleeve in the throat and in alinement with the plunger 56. A handle 103 of convenient shape, and a boss 104 to contact a safety control rod 64, are also provided.

Other molding methods

Figure 17 illustrates diagrammtically an open compression type mold with a package holding the proper volume of heated material to form the work, lying in the cavity. By supplying the material in package form, the mold can be operated much faster than by conventional methods.

Figure 18 illustrates diagrammatically the use of a package in a transfer type mold to greatly increase the output of the mold.

Figure 19 illustrates diagrammatically the use of a package in a plunger type mold to greatly increase the output of the mold.

Packages of rigid polyvinyl chloride

Certain thermoplastic molding materials like rigid, or unplasticised, polyvinyl chloride present special problems due to their tendency to become degraded if heated beyond certain critical temperatures. As a result, it is not practical to heat these materials by conduction in conventional heating chambers with surfaces maintained at temperatures destructive to these materials.

Such materials can be safely plasticated by using a screw type of extruding apparatus which heat the material partly by heat created by the mechanical kneading of the material and only partly by conduction from hot surfaces, and the material is maintained in a turbulent condition to avoid local overheating.

It is desirable to maintain the screw of this type extruder in continuous rotation, therefore means must be provided to convert the continuous stream of heated material into packages.

Figure 4 illustrates diagrammatically a molding attachment for a continuously operating screw type extruder in which a pair of molds are used, one of said molds adapted to being filled with material to make a package while the other is being manipulated to eject the finished package into a transfer sleeve for storage and subsequent transfer to an injection molding press.

The attachment comprises a manifold 81 which is secured to the discharge end of a screw type extruder. The manifold has a divided material passage terminating in a pair of ports 82 each of which is provided with a material control valve 83 including a plunger 84 adapted to block the flow of material through the port.

Attached to the discharge side of the valve 83 is a chill plate assembly including a cap 86 of the type heretofore described and shown in Figure 1, and including a chill plate 23 and nozzle 20.

Each material control valve 83 has attached to it a fluid operated piston and cylinder mechanism 85 adapted to operate the valve plunger 84, Figures 4 and 6, in such manner as to open one valve for the passage of material while simultaneously closing the other, with a control rod and spacer 87 assuring the proper sequence of operation.

Figure 6 is an enlarged sectional view showing a construction suitable for the material flow control valve 83 and the fluid driven valve actuating device 85, in which 88 is a differential type piston with integral double end plunger, with a hole in it to accommodate a pull rod 89 which pulls the plunger the direction to shear the stream of material and stop its flow, while spacer 90 is adapted to push the plunger 84 back into position with the port 91 alined with the passage 82. The cylinder heads 92 are provided with O-ring packings and with a passage for pressure fluid.

The manifold 81 is provided with a series of grooves 92–a to accommodate electric heating elements. The cap 86 is provided with a band type heating element 93.

Each mold 24 is independently operated, and fitted with an ejector rod 41 and bracket 52–a, and functions in the manner heretofore described under "Operation of Molding Attachment."

Electric control circuits—Pot assembly

Figures 8, 9:
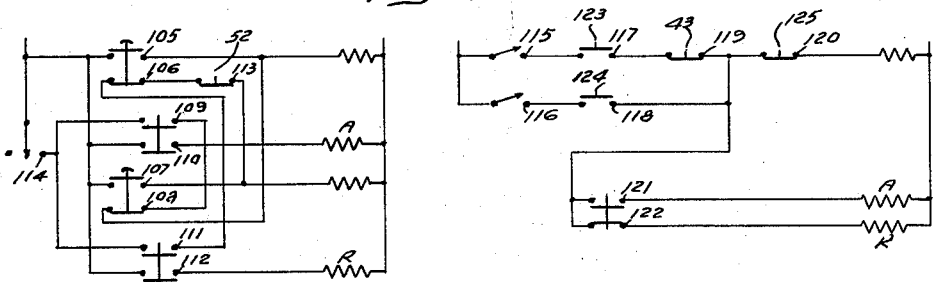
Figure 8 is an elemental electrical circut adapted to control the advance and retraction of a pot assembly.
Figure 9 is an elemental electric circuit for controlling the intermittent operation of the plunger of this apparatus.

Figure 8 is an elemental circuit for controlling the advance and retraction of the pot assembly, and includes an Advance pushbutton with a N.O. contact 105 and N.C. contact 106, a Retract pushbutton with N.O. contact 107 and N.C. contact 108, an Advance contactor with N.O. contacts 109—110, a Retract contactor with N.O. contacts 111—112, a Dwell limit switch with N.C. contact 113 and an Inch-Run selector switch having a contact 114.

For normal operation, the selector switch is turned to Run, closing contact 114. To advance the pot assembly, the Advance button is momentarily pressed to close contact 105 which will energize the Advance contactor closing the seal contact 109 and contact 110 to energize the Advance coil of a spring centered four way valve controlling the fluid operated mechanism 35, Figure 1.

To retract the pot assembly, the Retract button is momentarily pressed, opening contact 108 to break the seal circuit of the Advanced contactor and to close contact 107 to energize the Retract contactor to close its seal contact 111 and the contact 112 to energize the Retract coil of the fluid valve. The pot assembly will retract until the limit switch 52, Figure 1, is tripped to open contact 113 breaking the seal circuit to deenergize the Retract contactor, de-energizing the valve coil and halting the retraction of the assembly until the Retract button is again held briefly to resume the retraction. Turning the selector to Inch will open the seal circuits and the assembly will move only so long as the proper button is held.

Automatic plunger control

Figure 9 is an elemental circuit for controlling the operation of the plunger of this apparatus comprising an Off-Run selector switch with contact 115, a Run-Purge selector switch with contact 116, a limit switch 123 tripped by the advanced pot assembly with N.O. contact 117, a limit switch tripped by the retracted pot assembly with N.O. contact 118, a limit switch 43, Figure 1, tripped by the metering rod 40, with N.O. contact 119, a shipper rod operated reversing switch 125 with N.C. contact 120, and a plunger reversing contactor with N.O. contact 121 and N.C. contact 122.

For normal operation, the Off-Run selector is turned to Run, closing contact 115. Then the pot assembly is advanced (see "Pot Assembly Movement") to trip switch 123 and close contact 117. The advanced assembly moves the metering rod 40 to trip switch 43, Figure 1, to close contact 119 completing the circuit thru the closed contact 120 of the reversing switch 125, Figure 12, to energize the reversing contactor, closing contact 121 to energize the Advance coil of the spring centered four way valve controlling the plunger operation.

As the plunger completes its stroke it trips the reversing switch 125 to open contact 120, de-energizing the reversing contactor, opening the Advance coil circuit at contact 121 and simultaneously energizing the Retract coil circuit by closing contact 122. The plunger then retracts, and repeats.

The pumping action of the plunger continues until the proper volume of material has been forced into the pot assembly, causing the piston 37, Figure 2, to move the metering rod 40 to the left against the resistance of the spring 41, to release the switch 43 and open its contact 119 to de-energize the circuit to both of the valve coils, centering the valve spool and halting the plunger action until the assembly has been retracted, the package ejected, and the assembly again advanced for the next cycle.

To operate the plunger for test or purging, the pot assembly is first retracted to open contact 117 in switch 123, and to close contact 118 in switch 124. The Off-Run selector is turned to Off, to open contact 115. The Run-Purge selector is turned to Purge, to close contact 116. This completes the circuit to the reversing switch and contactor, and the plunger will start and will continue its pumping action until the selector is turned back to Run.

Material flow valve control

Figure 10:
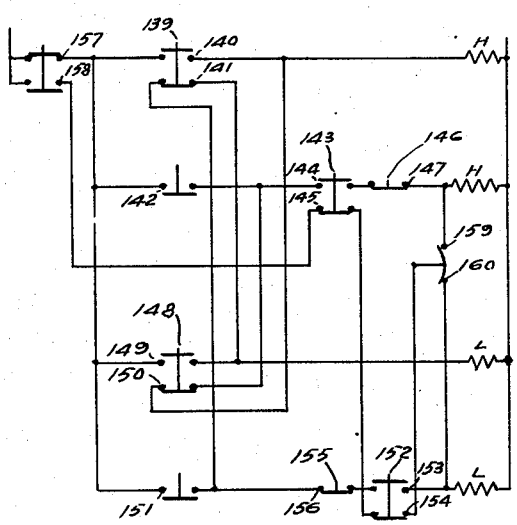
Figure 10 is an elemental electric circuit for controlling the sequence of operation of the nozzle valves used with a pair of pot assemblies.

Figure 10 is an elemental circuit to operate the two material flow control valves 83–h and 83–l, Figure 4, in their proper sequence. The circuit is divided into two substantially identical sections identified as High and Low for convenience in describing their operation.

The High circuit comprises a two circuit limit switch 139 with N.O. contact 140 and N.C. contact 141 operated by the High mold when retracted, a High contactor with a N.O. contact 142, a two circuit limit switch 143 with N.O. contact 144 and N.C. contact 145 operated by the High mold when advanced, and a metering switch 146 with N.C. contact 147 operated by the advanced Low mold. (For brevity the pot assembly is here called "mold.")

The Low circuit comprises a two circuit limit switch 148 with N.O. contact 149 and N.C. contact 150, operated by the Low mold when retracted, a Low contactor with N.O. contact 151, a two circuit limit switch 152 with N.O. contact 153 and N.C. contact 154 operated by the Low mold when advanced, a metering switch 155 with N.C. contact 156 operated by the advanced High mold.

There is a common Meter-Purge selector switch with contact 157 on Meter and contact 158 on Purge. Also a common High-Low selector switch with contact 159 on High and contact 160 on Low.

For normal operation the selector is turned to Meter to close contact 157. Both molds should be in retracted position, with contact 140 of switch 139 closed to energize the High contactor, closing contact 142. The High valve coil circuit is open at contact 144 of switch 143.

First the sequence is started by advancing the Low mold to close contact 150 in switch 148 to seal in the contactor in the High circuit. The Low contactor is simultaneously de-energized by opening contact 149.

Then the High mold is advanced which opens contact 140 in switch 139, but the High contactor remains energized through the seal contact 150 of switch 148. The advanced mold then closes contact 144 of switch 143, but the valve coil circuit remains open at contact 147 of switch 146 which was tripped by the advanced Low mold.

Finally the Low mold is retracted, first closing the contact 147 in Metering switch 146 which completes the circuit through the High valve coil to immediately position the fluid valve spool to operate the small cylinder 85–h, Figure 4, opening the material flow valve 83–h and simultaneously closing the valve 83–l. Material will now flow into the High mold.

Complete retraction of the Low mold opens contact 150 to break the seal circuit to de-energize the High contactor and the High valve circuit. This will have no effect upon the position of the valve spool, and the material valve 83–h will remain open.

During the filling of the High mold, the Low mold must again be advanced to the filling position before the High mold can receive its full charge. Advancing the Low mold will energize the Low contactor through the seal contact 141 of switch 139, but the Low valve coil circuit is kept open by the High mold at contact 156 of the metering switch 155 until the High mold has received its full charge.

When the High mold has been filled a metering mechanism as described and illustrated in Figure 1 operates to trip the metering switch 155 and close contacts 156. Inasmuch as the High valve coil has already been de-energized, closing contact 156 and energizing the Low valve coil will immediately shift the fluid valve spool to its opposite position to cause the opening of the material valve 83–l and the closing of valve 83–h. Material will now flow into the Low mold.

The High mold must now be retracted, the molded material comprising a package ejected, and the mold again advanced into filling position before the Low mold receives its full charge, and the valve spool again shifted to cause material to flow through the High mold nozzle.

To check or to purge the apparatus, both molds are first retracted, and material is permitted to flow from one or the other of the nozzles. Then the selector should be turned to Purge, closing contact 158. After this, material can be purged from either or both of the nozzles by manipulating the High-Low selector.

Dual mold movements

Figure 11:
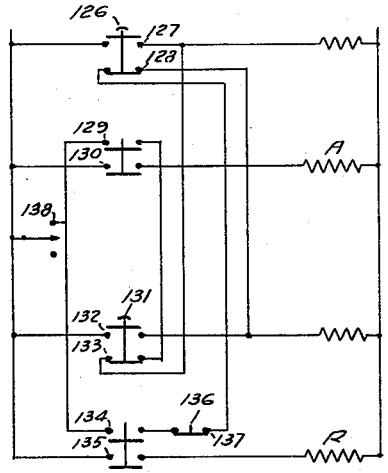
Figure 11 is an elemental electric circuit for controlling the sequence of operation of the pot assemblies when used in pairs.

Figure 11 is an elemental circuit to control the movement of one of the two molds included in the dual molding attachment for packaging heated molding material which is being supplied in a continuous stream. The circuit comprises an Advance push button 126 with N.O. contact 127 and N.C. contact 128, and an Advance contactor with N.O. seal contact 129 and N.O. coil contact 130, a Retract pushbutton 131 with N.O. contact 132 and N.C. contact 133, a Retract contactor with N.O. seal contact 134 and N.O. coil contact 135, a Dwell limit switch 136 with N.C. contact 137 and a Run-Inch selector switch with contact 138. Each of the two molds is operated separately substantially in the manner described heretofore under the section Pot Assembly. Two complete circuits, as shown in Figure 11 are required for the dual mold (pot assembly) machine.

For the sake of brevity, this description omits more than a short reference to the pressure fluid components of the apparatus which comprise standard pumps, valves and controls obtainable on the open market. In like manner, the electrical controls are briefly described, but sufficiently to enable one experienced in this field to construct an operable control system from parts purchased in the open market.

It has been my endeavor to describe fully and clearly the reasons for and the making of an individual package of heated, measured and shaped thermoplastic material for molding purposes, with particular reference to its use in an injection molding machine where it is further heated, and with less emphasis on the use of the package for compression, transfer and plunger molding.

It will be apparent that many changes and modifications of the disclosed apparatus may be made without departing from the spirit of the invention as defined in the following claims.

Having described my invention, I claim:

In a machine to package fluid thermoplastic molding material heated only to its flow temperature the combination comprising an extruder having a plunger normally at rest, pressure fluid operated means to drive the plunger, a source of pressure fluid, a heating chamber having a flat tipped nozzle at the discharge end, means to heat the chamber, means to heat the nozzle, a stripper type spring actuated chill plate surrounding the nozzle, air insulated therefrom, normally positioned with its face advanced relative to the nozzle tip, and axially movable under pressure to an operative position with its face alined with the nozzle tip, means to cool the chill plate, fluid valving means normally controlled by automatically actuated switching mechanisms to start and stop the operation of the plunger driving means thereby to deliver a prescribed volume of fluid material through the nozzle to make a package, the said valving means being also selectively responsive to a manually actuated switching mechanism to start and to stop the operation of the plunger driving means thereby to deliver fluid material through the nozzle for purging purposes, a reciprocable pot assembly having a straight cylindrical bore the near end of which is normally axially spaced relative to the chill plate to normally provide space to accommodate a transfer sleeve or selectively to position a scrap receptacle for purging purposes, means to cool said bore, a fluid driven reciprocating motor to selectively advance the pot assembly into pressure association with the chill plate simultaneously forcing the face of the chill plate to line with the nozzle tip, or to retract said assembly to its normally spaced position relative to the chill plate, fluid valving means controlled by a manually actuated switching mechanism to energize said motor to advance and to retract the pot assembly while the plunger is at rest, a piston fitted with constant frictional means of prescribed value to maintain a static condition operating in the bore of the pot assembly, cooled by contact with the bore, and normally positioned adjacent the near end of the pot assembly, a stop rod to normally engage the piston and halt its movement during the retraction of the pot assembly thereby to restore the piston to its normal position in the bore of the assembly, a switching mechanism actuated by the pot assembly as it associates with the chill plate to energize the fluid valving means and start the normal operation of the plunger, a switching mechanism operated by the piston upon reaching a prescribed position in the bore of the pot assembly to de-energize the fluid valving means and stop the normal operation of the plunger, and a switching mechanism manually operated to energize and de-energize the fluid valving means when the pot assembly is in its normally retracted position to start and to stop the operation of the plunger for purging.

References Cited in the file of this patent

UNITED STATES PATENTS

| | | |
|---|---|---|
| 2,375,955 | Smith | May 15, 1945 |
| 2,689,376 | Wacker | Sept. 21, 1954 |